United States Patent
Rashkovskiy et al.

(10) Patent No.: US 6,181,376 B1
(45) Date of Patent: Jan. 30, 2001

(54) METHOD OF DETERMINING MISSING COLOR VALUES FOR PIXELS IN A COLOR FILTER ARRAY

(75) Inventors: Oleg Rashkovskiy, Cupertino; William Macy, Palo Alto, both of CA (US)

(73) Assignee: Intel Corporation, Santa Clara, CA (US)

(*) Notice: Under 35 U.S.C. 154(b), the term of this patent shall be extended for 0 days.

(21) Appl. No.: 08/950,166

(22) Filed: Oct. 14, 1997

(51) Int. Cl.[7] ............................................ H04N 3/14
(52) U.S. Cl. ................................. 348/273; 348/280
(58) Field of Search ............................. 348/207, 222, 348/234, 235, 272, 273, 274, 281, 282, 280; H04N 3/14

(56) References Cited

U.S. PATENT DOCUMENTS

| | | |
|---|---|---|
| 3,971,065 | 7/1976 | Bayer . |
| 5,065,229 * | 11/1991 | Tsai et al. .............................. 348/273 |
| 5,805,217 * | 9/1998 | Lu et al. ................................. 348/273 |
| 5,808,674 * | 9/1998 | Adams et al. ......................... 348/273 |
| 5,990,950 * | 11/1999 | Addison ................................. 348/273 |

OTHER PUBLICATIONS

Dillon, Lewis, Kaspar; "Color Imaging System Using A Single CCD Area Array"; IEEE Transactions on Electron Devices, vol. ED–25, No. 2, Feb. 1998, pp. 102–107.

Gonzales, Woods, "Digital Image Processing", Addison–Wesley Publishing Company, Jun. 1992, pp. 195–197.

Weldy, "Optimized Design for a single–sensor color electronic camera system", SPIE vol. 1071, Optical Sensors and Electronic Photography (1989), pp. 300–308.

John E. Greivenkamp, "Color dependent optical prefilter for the suppression of aliasing artifacts", Applied Optics, vol. 29, No. 5, Feb. 10, 1990, pp. 676–684.

Unser, Aldroubi, Eden, "Fast B–Spline Transforms for Continuous Image Representation and Interpolation", IEEE Transactions on Pattern Analysis and Machine Intelligence, vol. 13, No. 3, Mar. 1991, pp. 277–285.

* cited by examiner

*Primary Examiner*—Tuan Ho
(74) *Attorney, Agent, or Firm*—Steven P. Skabrat

(57) ABSTRACT

Missing color values for pixels in a color filter array created by a digital camera and having a Bayer pattern are generated by determining values for all missing green color values for pixels in the color filter array by interpolation of known green color values adjacent along diagonal lines and determining values for all missing red and blue color values for the pixels from the sum of an interpolation term and a luminance correction term based on differences between green color values of adjacent pixels. The missing green color values are determined by computing temporary values for green which lie at the corners of pixels having known green color values using cubic B-spline filters oriented along diagonally adjacent green color pixels, determining final values for green at the centers of pixels having known red and blue values by using cubic B-spline filters oriented along diagonally adjacent red and blue color pixels, and by sampling the temporary green values.

17 Claims, 7 Drawing Sheets

FIG. 1
(PRIOR ART)

| R11 | G12 | R13 | G14 |
|-----|-----|-----|-----|
| G21 | B22 | G23 | B24 |
| R31 | G32 | R33 | G34 |
| G41 | B42 | G43 | B44 |

FIG. 4a

| R11 | G12 | R13 | G14 |
|-----|-----|-----|-----|
| G21 | B22 | G23 | B24 |
| R31 | G32 | R33 | G34 |
| G41 | B42 | G43 | B44 |

|    | 0 | 1 | 2 | 3 | 4 | 5 | 6 | 7 | 8 | 9 | 10 | 11 | 12 | 13 | 14 | 15 | 16 | 17 |
|----|---|---|---|---|---|---|---|---|---|---|----|----|----|----|----|----|----|----|
| 0  | R | G | R | G | R | G | R | G | R | G | R  | G  | R  | G  | R  | G  | R  | G  |
| 1  | G | B | G | B | G | B | G | B | G | B | G  | B  | G  | B  | G  | B  | G  | B  |
| 2  | R | G | R | G | R | G | R | G | R | G | R  | G  | R  | G  | R  | G  | R  | G  |
| 3  | G | B | G | B | G | B | G | B | G | B | G  | B  | G  | B  | G  | B  | G  | B  |
| 4  | R | G | R | G | R | G | R | G | R | G | R  | G  | R  | G  | R  | G  | R  | G  |
| 5  | G | B | G | B | G | B | G | B | G | B | G  | B  | G  | B  | G  | B  | G  | B  |
| 6  | R | G | R | G | R | G | R | G | R | G | R  | G  | R  | G  | R  | G  | R  | G  |
| 7  | G | B | G | B | G | B | G | B | G | B | G  | B  | G  | B  | G  | B  | G  | B  |
| 8  | R | G | R | G | R | G | R | G | R | G | R  | G  | R  | G  | R  | G  | R  | G  |
| 9  | G | B | G | B | G | B | G | B | G | B | G  | B  | G  | B  | G  | B  | G  | B  |
| 10 | R | G | R | G | R | G | R | G | R | G | R  | G  | R  | G  | R  | G  | R  | G  |
| 11 | G | B | G | B | G | B | G | B | G | B | G  | B  | G  | B  | G  | B  | G  | B  |
| 12 | R | G | R | G | R | G | R | G | R | G | R  | G  | R  | G  | R  | G  | R  | G  |
| 13 | G | B | G | B | G | B | G | B | G | B | G  | B  | G  | B  | G  | B  | G  | B  |
| 14 | R | G | R | G | R | G | R | G | R | G | R  | G  | R  | G  | R  | G  | R  | G  |
| 15 | G | B | G | B | G | B | G | B | G | B | G  | B  | G  | B  | G  | B  | G  | B  |
| 16 | R | G | R | G | R | G | R | G | R | G | R  | G  | R  | G  | R  | G  | R  | G  |
| 17 | G | B | G | B | G | B | G | B | G | B | G  | B  | G  | B  | G  | B  | G  | B  |

FIG. 7

METHOD OF DETERMINING MISSING COLOR VALUES FOR PIXELS IN A COLOR FILTER ARRAY

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates generally to computer graphics and more specifically to the manipulation of color filter arrays used to represent color images captured by a digital camera.

2. Description of Related Art

Digital cameras that capture color images are rapidly becoming popular. These digital cameras are used for still photography and full motion video recording. The images captured by the camera may be transferred to a computer system and displayed on a computer monitor for viewing by the user. The increasing power of microprocessors permits many sophisticated and computationally intensive image processing operations to be performed by software executing on the computer system rather than by special purpose circuitry in the camera. Image processing methods implemented in software allow presentation of higher quality images to the user while lowering the cost of the digital camera, because the specialized circuitry for performing various image processing operations is no longer needed.

Most commercial digital cameras use a single-chip color filter array to capture images. The color filter array is located in the focal plane of the camera in the same place that film is located in a traditional film camera. A single-chip color filter array is a two-dimensional grid of picture elements, called pixels, covered by color filters. Each pixel is typically implemented through the use of a charge-coupled device (CCD) or CMOS circuit. To minimize the cost of the color filter array (and therefore the cost of the camera), only one of the red, green or blue colors is sensed at each pixel. Hence, information for two colors of a red, green, and blue (RGB) color combination is missing at each pixel of the sensed image. The colors that are sensed are arranged in a predetermined pattern in the color filter array so that the entire image may be represented to the user in an aesthetically pleasing manner, despite the missing color information. One pattern that is useful for representing such images is disclosed in U.S. Pat. No. 3,971,065, issued to B. E. Bayer. There are also many other patterns that can be used to represent color images.

An example of a color filter array with a Bayer pattern is shown in FIG. 1. Pixels are represented by squares in the grid of FIG. 1. Each pixel includes an electronic sensor which measures the light falling on it. Those pixels which have a red filter measure red light and are represented by an R in the pattern, those pixels which have a green filter measure green light and are represented by a G in the pattern, and those pixels which have a blue filter measure blue light and are represented by a B in the pattern. The Bayer pattern is replicated throughout the entire color filter array in both the horizontal and vertical directions.

A problem with this method of capturing color images is that only a single color is sensed and stored at each pixel in the color filter array, although three colors (red, green and blue) are needed to reconstruct the true color at each pixel. Typically, each pixel is represented by eight bits for a color. Hence, the amount of color information being collected at each pixel in the captured image is only eight bits, but 24 bits are needed for the complete set of red, green and blue color values for the pixel. Cameras which use a single color filter array must determine the missing color values at each pixel. For example, values of missing red and blue colors must be found for a pixel with a green filter.

Existing systems use color values of adjacent pixels to interpolate the missing color values. The simplest approach is to treat each color plane separately. A color plane is the representation of a single color for the whole color filter array. With the separate color plane method, missing red, green, and blue values are determined by reference to neighboring red, green, and blue pixels, respectively.

Some methods for computing missing color values use color values from other color planes. In most cases, values from the green plane are combined with values of adjacent red pixels to determine missing red values, and values from the green plane are combined with values of adjacent blue pixels to determine missing blue values. Generally, color array patterns (such as the Bayer pattern) use more green pixels than red or blue pixels. Using more green pixels than red and blue pixels improves luminance resolution or sharpness of the image without significantly degrading color quality. A method disclosed by P. D. Dillon, D. M. Lew, and F. G. Kaspar in "Color Imaging System Using A Single CCD Array", IEEE Trans. Electron Devices, vol. ED-32, pp. 102–107, 1978, combines green with other colors, subtracts a purposely blurred green value from an original green value, and adds the difference to all three color planes. This method is an image sharpening technique also known as unsharp masking as discussed by R. C. Gonzalez and R. E. Woods in "Digital Image Processing", published by Addison-Wesley of Reading, Mass., 1992. Another method, taught by J. A. Weldy in "Optimized Design For A Single-Sensor Color Electron Camera System", Proceedings of SPIE, vol. 107, vol. 1071, pp. 300–308, 1989, linearly interpolates missing green values so that there are green values at all pixel locations, and then uses the difference between red and green at red pixel locations to interpolate missing red values, and the difference between blue and green at blue pixel locations to interpolate missing blue values.

These methods for interpolating missing color values suffer from two problems. Interpolation results in blurred images, and inaccurate interpolation of red and blue values tends to produce aliasing artifacts at object boundaries within the image. Object boundaries may appear as red or blue instead of their true colors. Most cameras reduce these aliasing artifacts by optically blurring the image before it reaches the sensor. This technique is discussed by J. E. Grievenkamp in "Color Dependent Optical Prefilter For The Suppression Of Aliasing", Applied Optics, vol. 29, pp. 676–684, February 1990. A new method is needed which overcomes these problems by forming a compromise between blurring and aliasing reduction methods to provide excellent quality, true color images in a cost-efficient manner.

SUMMARY OF THE INVENTION

An embodiment of the present invention is a method for generating missing color values for pixels in an array, each pixel having one of three color values. The method includes the steps of determining values for all missing second color values for pixels in the array by interpolation of known second color values adjacent along diagonal lines from the missing second color values, and determining values for all missing first and third color values for the pixels from a sum of an interpolation term and a luminance correction term based on differences between second color values of adjacent pixels.

BRIEF DESCRIPTION OF THE DRAWINGS

The features and advantages of the present invention will become apparent from the following detailed description of the present invention in which:

Figure 1:
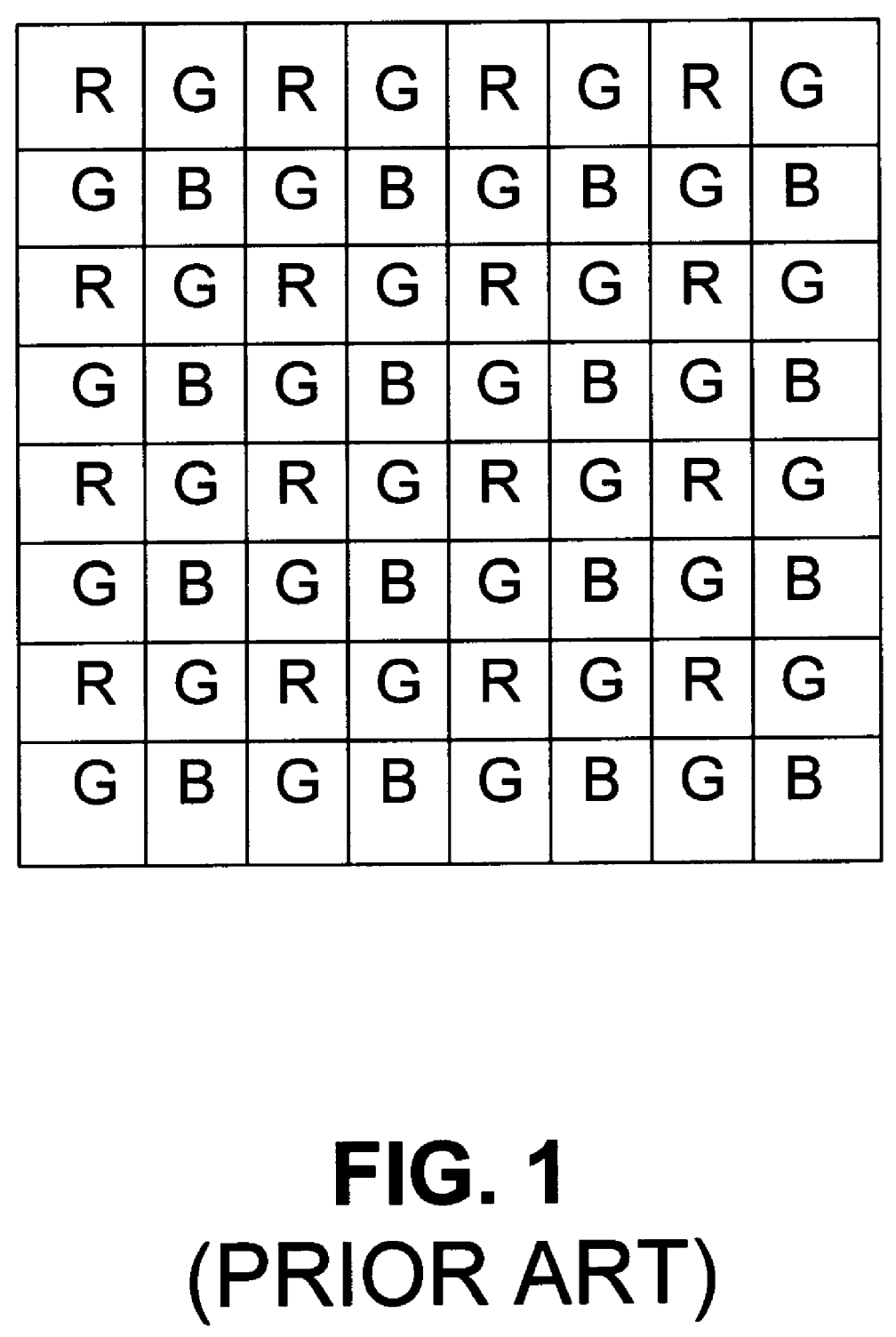

FIG. 1 is a diagram of a Bayer pattern (Prior Art).

FIGS. 4a–b are diagrams of sample Bayer patterns of pixels showing diagonal lines of processing according to the present invention.

FIGS. 6a–d are diagrams of possible color patterns to be processed by the present invention.

FIG. 7 is a diagram of a detailed example of a Bayer pattern as processed by the present invention.

DETAILED DESCRIPTION OF THE PRESENT INVENTION

In a single-sensor system, the three colors of information (typically red, green, and blue) cannot be sampled by each pixel of the sensor. However, for an aesthetically pleasing display of the current scene, three colors of information should be displayed at every pixel. Therefore, image reconstruction processing is used to create three color information at every pixel of the display. The present invention is a method of image reconstruction processing for determining missing color values for a color filter array which results in an excellent quality image without requiring purposely blurring of the image by the camera. It effectively allows for improving or increasing the pixel depth of a displayed image to provide a more accurate representation of a sensed image.

Embodiments of the present invention include methods for "upsampling" 8-bit color filter array values into 24-bit color values for a color image captured by a digital camera. However, the present invention can be used in any computer application where individual red, green, and blue color values are represented in an array and the depth of the pixels needs to be improved. Typically, the depth improvement will be from 8 bits to 24 bits. However, other depth improvement operations (for example, from 16 bits to 48 bits) are also within the scope and spirit of the present invention. The present invention also is applicable to color schemes using colors other than red, green, and blue. Furthermore, the present invention is discussed below in terms of an implementation in software, however, an implementation in hardware is also feasible.

Figure 2:
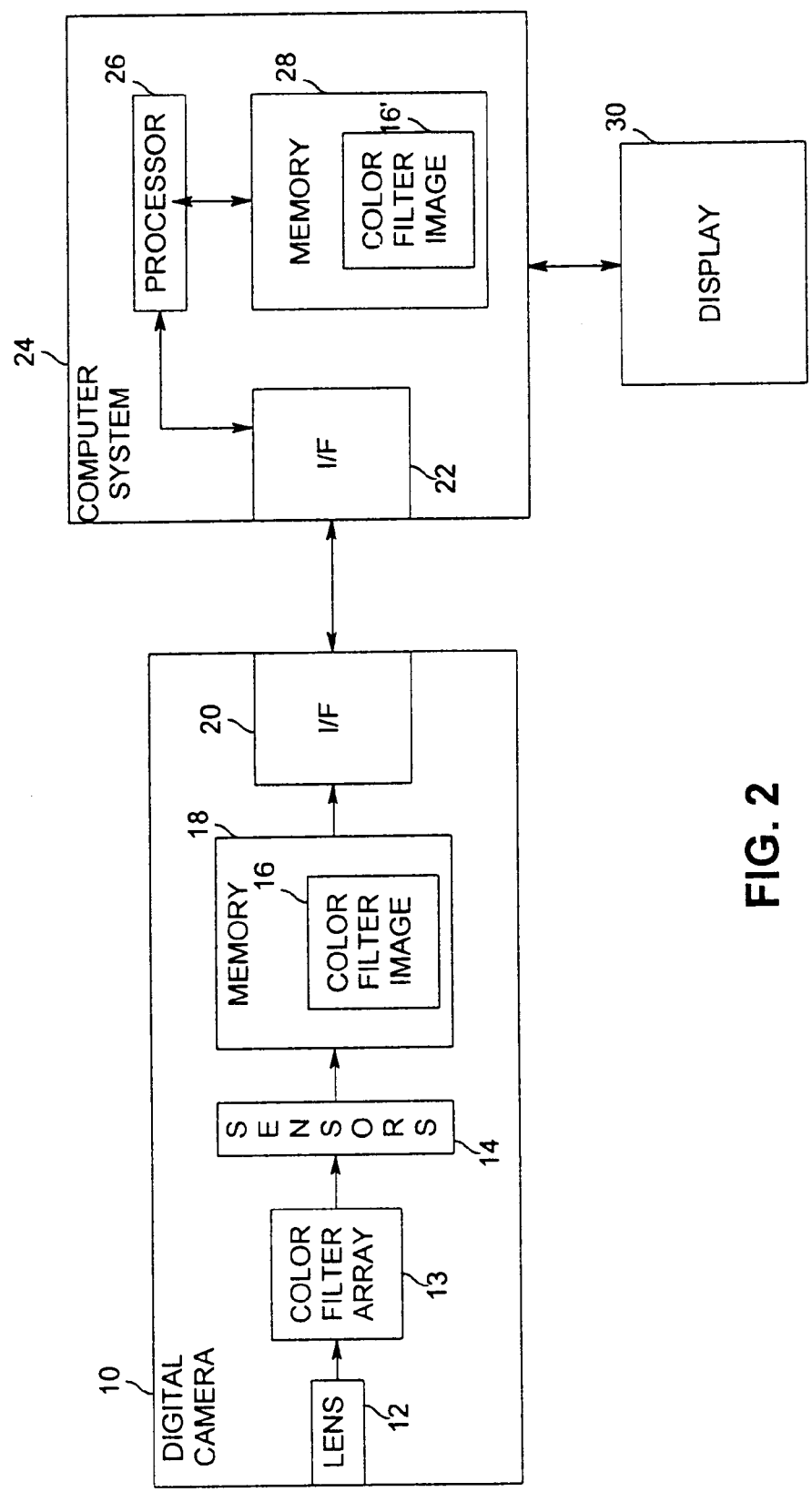
FIG. 2 is a block diagram of a digital camera having a color filter image stored in a memory.

FIG. 2 is a block diagram of a digital camera having a color filter image stored in a memory. Digital Camera 10 uses Lens 12 to accept light from the environment around the camera. The light passes through and is filtered by Color Filter Array 13 and is sensed by electronics Sensors 14. The resulting Color Filter Image 16 is stored in Memory 18. The Sensors may be CCDs, CMOS arrays, or other light sensing devices. The Color Filter Image is a representation of the image sensed by the camera. Memory 18 is coupled to Interfaces (I/F) 20, 22 to connect Digital Camera 10 to a Computer System 24 for displaying the captured images. Computer System 24 is a general purpose computer such as a personal computer (PC) or workstation having a Processor 26, Memory 28, and a Display 30. The Color Filter Image 16 generated by Digital Camera 10 is stored as Color Filter Image 16' in Memory 28 in Computer System 24 and manipulated as a result of instructions being executed by Processor 26 according to the present invention.

Figure 3:
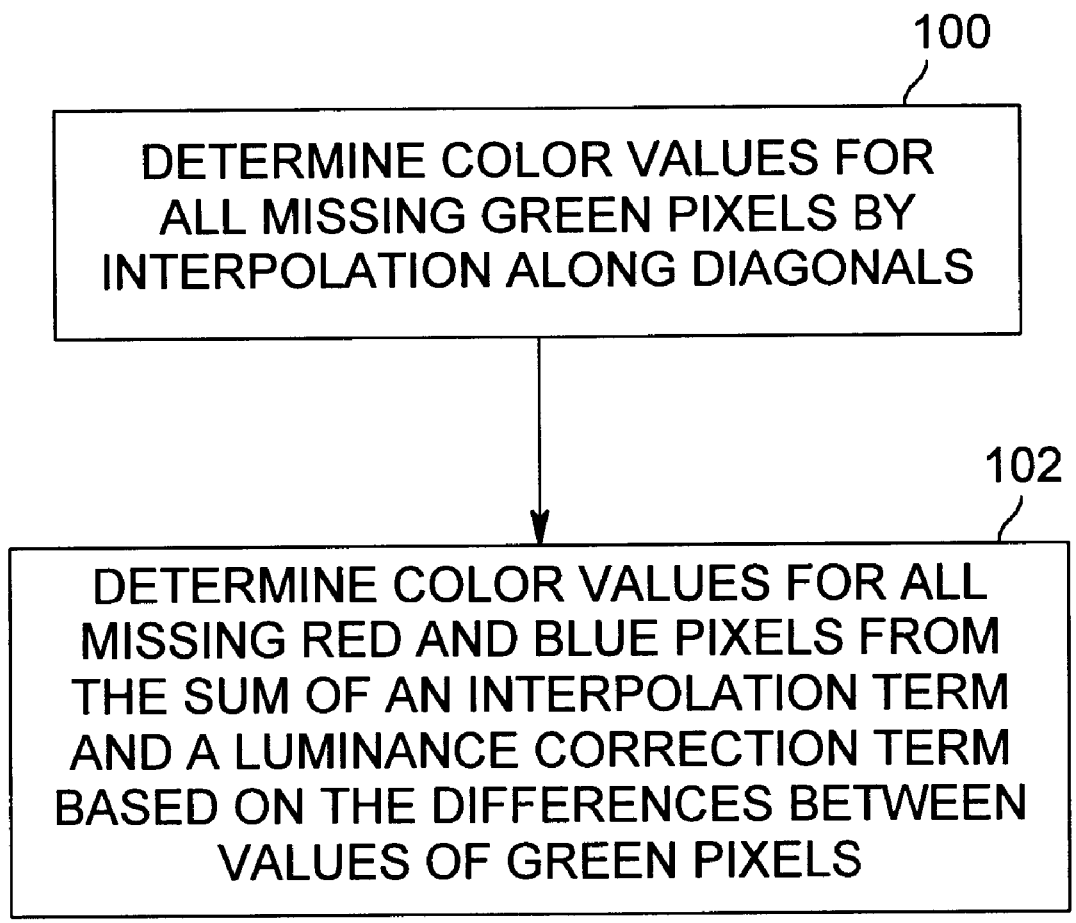
FIG. 3 is a high level flow diagram of the processing steps of the present invention.

FIG. 3 is a high level flow diagram of the processing steps of the present invention. The Color Filter Image 16' has a plurality of individual pixels, each pixel being one of the red, green, and blue colors, with the other two colors being missing at each pixel. At Step 100, color values for all missing green pixels are determined by interpolation based on known green pixels adjacent along diagonal lines. At Step 102, the color values for all missing red and blue pixels are determined from the sum of an interpolation term and a luminance correction term based on the differences between the values of neighboring green pixels.

Figure 5:
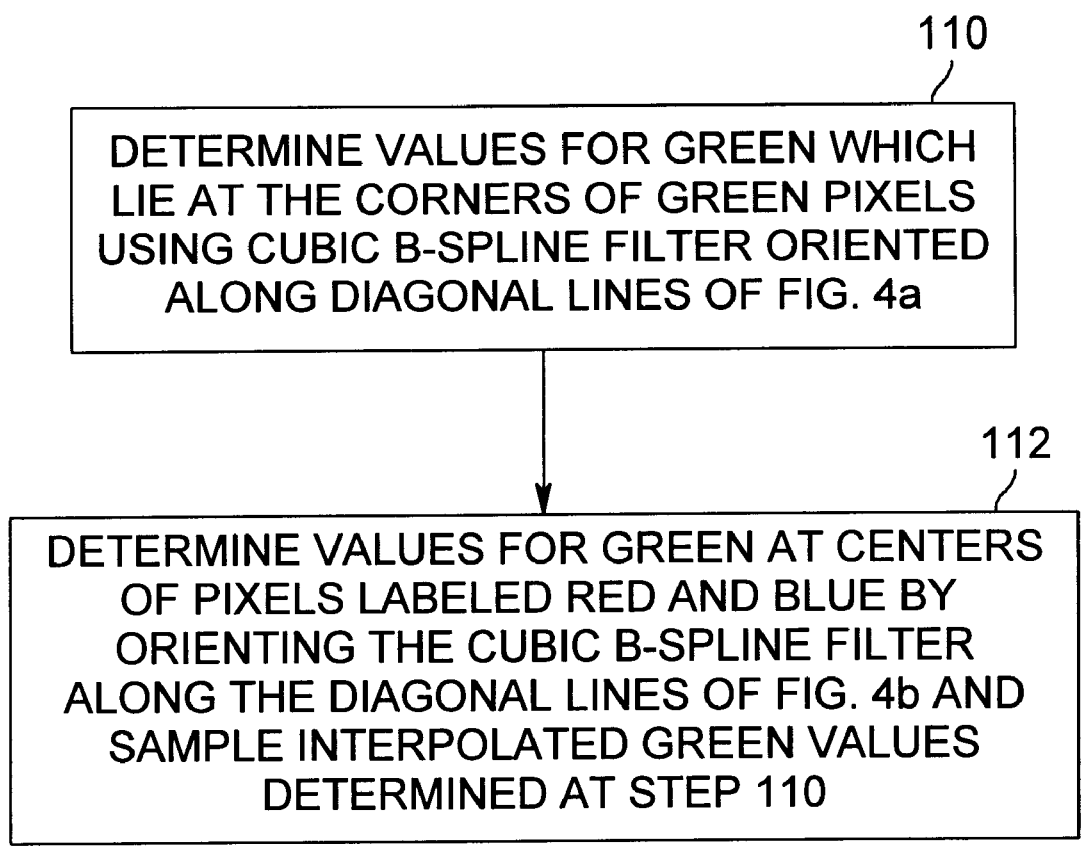
FIG. 5 is a flow diagram showing the steps of determining missing green pixels.

Missing green pixel values are computed at Step 100 using a cubic B-spline digital filter as disclosed by M. Unser, A. Aldroubi, and M. Eden in "Fast B-spline Transforms For Continuous Image Representation And Interpolation", IEEE Trans. Pattern Anal. Machine Intell., vol. 13, pp. 277–285, 1991. In an illustrative embodiment of the present invention, green pixels are sampled along diagonals instead of the conventional approach along rows and columns in the Color Filter Array. FIGS. 4a and 4B are diagrams of sample Bayer patterns of pixels showing diagonal lines of processing according to the present invention. The diagonal lines of FIG. 4a are lines angled diagonally connecting green pixels. The diagonal lines of FIG. 4b are lines angled diagonally (perpendicular to the first type) connecting alternating red and blue pixels. FIG. 5 is a flow diagram showing the steps of determining missing green pixels corresponding to Step 100 of FIG. 3. First, values for green at the corners of green pixels which lie on the diagonal lines of FIG. 4a are determined at Step 110 using the cubic B-spline filter oriented along the diagonal lines. Next, at Step 112, values for green at the centers of pixels labeled red and blue are determined by orienting the cubic B-spline filter along the diagonal lines of FIG. 4b and the interpolated green values at the corners of pixels determined in Step 110 are sampled.

The determination of the missing red and blue values of Step 102 of FIG. 3 can be illustrated by several examples using FIGS. 4a and 4b to indicate pixel positions in the Bayer pattern. The missing red value for the pixel at the first row of the second column, denoted $R_{12}$ is computed according to the present invention as $(R_{11}+R_{13})/2+(G_{12}-(G_{11}+G_{13})/2)$. The first term of the equation (referencing the adjacent red values) is called the interpolation term. This term is the linear interpolation of the neighboring red values. The second term (referencing the green values) is called the luminance correction term. This term represents the difference between green at the location of the interpolated value of red and green at the locations of measured red values used in the interpolation calculation. The luminance correction terms use results obtained from the green interpolation calculations of Step 100 of FIG. 3. The missing red value for the pixel at the second row of the first column, denoted $R_{21}$, is computed as $(R_{11}+R_{31})/2+(G_{21}-(G_{11}+G_{31})/2)$. The missing red value for the pixel at the second row of the second column, denoted $R_{22}$, is computed as $(R_{11}+R_{13}+R_{31}+R_{33})/4+(G_{22}-(G_{11}+G_{13}+G_{31}+G_{33})/4)$. Note that red values bordering edges of the image are determined by reference to only two adjacent red pixels; otherwise four diagonally adjacent red pixels are used for the interpolation term. In a similar manner, missing blue values are computed. The missing blue value for the pixel at the second row of the third column, denoted $B_{23}$, is computed according to the present invention as $(B_{22}+B_{24})/2+(G_{23}-(G_{22}+G_{24})/2)$. The missing blue value for the pixel at the third row of the second column, denoted $B_{32}$, is computed as $(B_{22}+B_{42})/2+(G_{32}-(G_{22}+G_{42})/2)$. The missing blue value for the pixel at the third row of the third column, denoted $B_{33}$ is computed as $(B_{22}+B_{24}+B_{42}+B_{44})/4+(G_{22}-(G_{11}+G_{13}+G_{31}+G_{33})/4)$. Note that blue values bordering edges of the image are determined by reference to only two adjacent blue pixels; otherwise four diagonally adjacent blue pixels are used for the interpolation term.

Figures 6A, 6C:
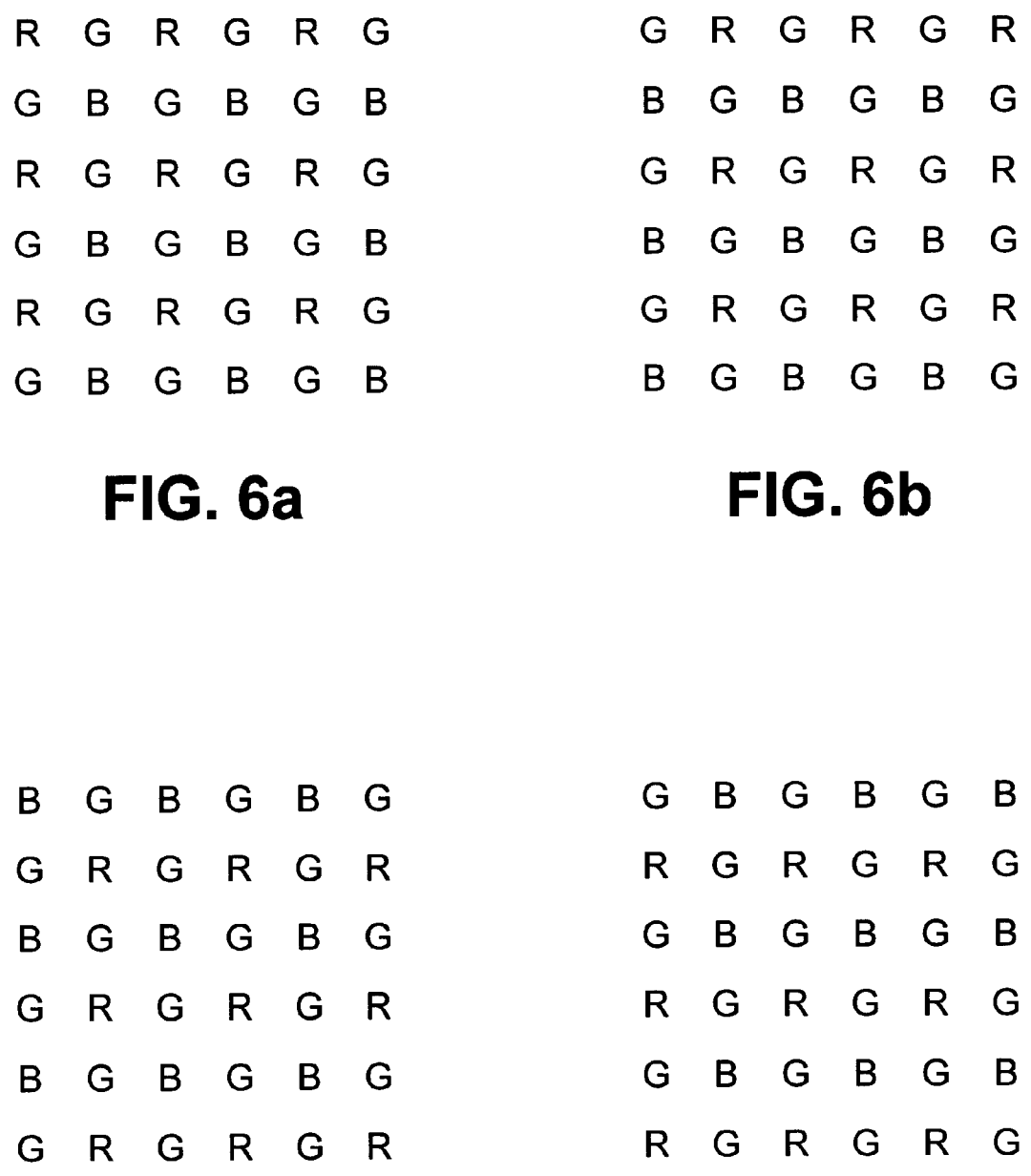

FIGS. 6a–d are diagrams of possible color patterns to be processed by the present invention. All are variations of Bayer patterns. FIG. 6a shows a pattern called "Bayer Pattern 1 Red Top." FIG. 6b shows a pattern called "Bayer Pattern 2 Red Top." FIG. 6c shows a pattern called "Bayer Pattern 1 Blue Top." FIG. 6d shows a pattern called "Bayer Pattern 2 Blue Top." Note the variations between the patterns. The present invention handles each of these patterns equally well.

FIG. 7 is a diagram of a detailed example of a Bayer pattern as processed by the present invention. One of the four possible Bayer patterns (the Bayer Pattern 1 Red Top pattern) is shown in FIG. 7. First, the green values for pixels marked as red (R) and blue (B) are computed by using diagonal splines whenever possible. Pixels along the boundaries of the sensed image must be handled differently than the pixels in the interior of the sensed image. It is not possible to use splines along the sensed image boundaries. Instead, linear interpolation is used along the boundaries. Linear interpolation is used to set an interpolated green value at a red or blue pixel equal to the average of the neighboring green pixels. For example, green values for two of the corners of the pattern of FIG. 7 are computed as $G_{0,0}=(G_{0,1}+G_{1,0})/2$ and $G_{17,17}=(G_{16,17}+G_{17,16})/2$. Those pixels with two green neighbors use the general form $G_{i,j}=(G_{i-1,j}+G_{i,j-1})/2$. Other pixels on the top and bottom rows, and the first and last columns, have three green neighbors. Therefore, for the top row, green values are computed as $G_{i,j}=(G_{i,j-1}+G_{i,j+1}+G_{i+1,j})/3$. For the bottom row, green values are computed as $G_{i,j}=(G_{i,j-1}+G_{i,j+1}+G_{i-1,j})/3$. For the left column, green values are computed as $G_{i,j}=(G_{i-1,j}+G_{i+1,j}+G_{i,j+1})/3$. For the right column, green values are computed as $G_{i,j}=(G_{i-1,j}+G_{i+1,j}+G_{i,j-1})/3$. All other linearly interpolate green values are computed using the equation $G_{i,j}=(G_{i-1,j-1}+G_{i-1,j+1}+G_{i+1,j-1}+G_{i+1,j+1})/4$.

The diagonal splines are computed by finding temporary values with the spline filter along one diagonal line, and then using those temporary values to find the final result with the spline filter along the other diagonal line. FIG. 7 shows an example of an eight tap filter with its top at $G_{0,7}$ and bottom at $G_{7,14}$. The filter result is $L_{0,3}$, halfway between the fourth and fifth pixel along the diagonal. $L_{0,3}$ represents an interpolated value in the green plane. It is computed as follows: $L_{0,3}=C_0G_{0,7}+C_1G_{1,8}+C_2G_{2,9}+C_3G_{3,10}+C_4G_{4,11}+C_5G_{5,12}+C_6G_{6,13}+C_7G_{7,14}$. The general form for a filter result is as follows:

$L_{i,k}$=the sum from m=0 to n−1 ($C_m G_{i,j+m}$) where n is the filter length, $C_m$ is the filter coefficient and k=floor (j/2).

For example, in FIG. 7, i=0, j=7, n=8, and k=floor (7/2)=floor (3.5)=3. Once the L values are found, green values at red and blue pixel locations can be computed. In FIG. 7, the filter whose top is at $L_{0,3}$ and whose bottom is at $L_{7,0}$ computes $G_{7,7}$ at the location of the circled B as $G_{7,7}=C_0L_{0,3}+C_1L_{1,3}+C_2L_{2,2}+C_3L_{3,2}+C_4L_{4,1}+C_5L_{5,1}+C_6L_{6,0}+C_7L_{7,0}$. The general form is as follows:

$G_{i,j}$=the sum from m=0 to n−1 ($C_m L_{i-n+1,k}$) where k=floor ((j−m)/2)

Note that in the example, all of the $L_{i,j}$ values to the upper left of the diagonal line whose top is $L_{0,3}$ are never used to compute green values because there are too few values (less than n) of $L_{i,j}$ along the diagonal.

The method for computing red and blue values according to the present invention can be generalized as follows. Interpolation of a red value at a location where the pixel in the original Bayer pattern (i.e., the sensed image) is green in a row of alternating reds is computed as $R_{i,j}=(R_{i,j-1}+R_{i,j+1})/2+(G_{i,j}-(R_{i,j-1}+R_{i,j+1})/2)$. Interpolation of a red value at a location where the pixel in the original Bayer pattern is green in a row of alternating blues is computed as $R_{i,j}=(R_{i-1,j}+R_{i+1,j})/2+(G_{i,j}-(R_{i-1,j}+R_{i+1,j})/2)$. Interpolation of a red value at a location where the pixel in the original Bayer pattern is blue is computed as $R_{i,j}=(R_{i-1,j-1}+R_{i-1,j+1}+R_{i+1,j-1}+R_{i+1,j+1})/4+(G_{i,j}-(G_{i-1,j-1}+G_{i-1,j+1}+G_{i+1,j-1}+G_{i+1,j+1})/4)$. Interpolation of a blue value at a location where the pixel in the original Bayer pattern is green in a row of alternating blues is computed as $B_{i,j}=(B_{i,j-1}+B_{i,j+1})/2+(G_{i,j}-(B_{i,j-1}+B_{i,j+1})/2)$. Interpolation of a blue value at a location where the pixel in the original Bayer pattern is green in a row of alternating reds is computed as $B_{i,j}=(B_{i-1,j}+B_{i+1,j})/2+(G_{i,j}-(G_{i-1,j}+G_{i+1,j})/2)$. Interpolation of a blue value at a location where the pixel in the original Bayer pattern is red is computed as $B_{i,j}=(B_{i-1,j-1}+B_{i-1,j+1}+B_{i+1,j-1}+B_{i+1,j+1})/4+(G_{i,j}-(G_{i-1,j-1}+G_{i-1,j+1}+G_{i+1,j-1}+G_{i+1,j+1})/4)$.

An embodiment of the present invention is represented below in the form of detailed pseudo-code in Appendix A.

Cubic spline interpolation produces better images than conventional methods by finding values with continuous and equal first derivatives and equal second derivatives at image points. Green pixels do not form a square grid along rows and columns of the image, but they do form a square grid along diagonals. Green pixels are evenly spaced and they are most closely spaced along diagonals. Cubic splines which interpolate halfway between two grid points, as in the present invention, can be computed with a digital filter which has a low computational complexity.

The luminance correction term corrects red and blue interpolation errors. Changes in green represent changes in luminance, which affects overall image sharpness. Interpolation of red and blue tends to produce a smooth transition between points in the image. The luminance correction term correlates red and blue color values with green so that if higher resolution green has a sharp transition, red and blue values are modified to take into account this transition. The luminance correction term increases image sharpness and reduces aliasing artifacts.

The combination of the effect of diagonal cubic spline interpolation and luminance correction according to the present invention provides sharp images with limited aliasing artifacts. The present invention also has low computational complexity. Results indicate that the optical blurring required to further suppress aliasing may be provided by focus errors and aberrations in low cost digital cameras alone without the need for additional blurring of the image by software.

Testing was accomplished by decimating good quality 24-bit color images so that the remaining pixel values are those of an 8-bit Bayer pattern, and then reconstructing the images according to the present invention. Differences between original and reconstructed images were difficult to detect when the original image was pre-filtered with a smoothing filter which removes only 15 percent of the high frequency content, rather than 50 percent as in prior art methods. Use of interpolated green values in the luminance correction term is supported by tests which show that interpolated green planes of images with high frequency content appear identical to the original green planes. The luminance correction increases image sharpness and reduces aliasing in images in which only the cubic spline filter is used. Results using the spline filter on red and blue planes do not differ noticeably from those results produced by using linear interpolation, so linear interpolation is used in the present method because it requires fewer operations. Testing results indicated that the present invention reconstructs images better than other conventional methods known in the art.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

SPS 10/9/97

APPENDIX A

© 1997 Intel Corporation

```
// spline_filter_length is number of coefficients in filter
boundary_width = spline_filter_length
// rows on top and bottom and columns on sides where spline filter cannot be used.

// determine green values where there are none
if Bayer pattern is 1 {
        // Process top rows on boundary where the spline filter cannot be used
        // Process first row with linear interpolation (average of adjacent pixels)
        // odd pixels are green and even are red
        // first row
        green_out[0][0] = rgb_input[0][1]   //first pixel first row
        Do i = 2 to i = row_length - 2,  increment i by 2 each loop
              {green_out[0][i] = (rgb_input[0][i-1] + rgb_input[0][i+1])/2 }
        // rows down to where splines can be done
        Do j = 1 to j = boundary_width - 2
              // linear interpolation for rows 1 through boundary_width
              {if 2 mod (j) equals 0      // even row pattern, odd pixels blue, even pixels green
                 {green_out[j][0] = rgb_input[j][1]
                 Do i =2 to i = row_length - 2,  increment i by 2 each loop
                       {green_out[j][i] = (rgb_input[j][i-1]+ rgb_input[j][i+1]+
                                          rgb_input[j-1][i]+ rgb_input[j+1][i])/4;}}
              else if 2 mod (j) equals 1    // odd row pattern, odd pixels green, even pixels red
                 {Do i = 1 to i = row_length - 3,  increment i by 2 each loop
                       {green_out[j][i] = (rgb_input[j][i-1]+ rgb_input[j][i+1]+
                                          rgb_input[j-1][i]+ rgb_input[j+1][i])/4;}
                 green_out[j][row_length-1] = rgb_input[j][row_length - 2]}}

// middle rows where splines can be done
        // linear interpolation at the beginning and end of rows
        Do j = boundary_width - 1 to columns_length - boundary_width  loop
```

SPS 10/9/97

```
        {if 2 mod (j) equals 0
            // even row pattern, odd pixels blue, even pixels green
        {// linear interpolate beginning of row
            green_out[j][0] = rgb_input[j][1]
            Do i = 2 to i = boundary_width - 2, increment i by 2 each loop
            {green_out[j][i] = (rgb_input[j][i-1] + rgb_input[j][i+1] +
                    rgb_input[j-1][i] + rgb_input[j+1][i])/4;}

// linear interpolate end of row
            Do i = row_length - boundary width + 2 to
                i = row_length - 2, increment i by 2 loop
            {green_out[j][i] = (rgb_input[j][i-1] + rgb_input[j][i+1] +
                    rgb_input[j-1][i] + rgb_input[j+1][i])/4;}}
        else if 2 mod (j) equals 1
            // odd row pattern, odd pixels green, even pixels red
        {// linear interpolate beginning of row
            Do i = 1 to i = boundary_width - 3, increment i by 2 each loop
            {green_out[j][i] = (rgb_input[j][i-1] + rgb_input[j][i+1] +
                    rgb_input[j-1][i] + rgb_input[j+1][i])/4;}

// linear interpolate end of row
            Do i = row_length - boundarywidth -1, to
                row_length -3 increment i by 2 loop
            {green_out[j][i] = (rgb_input[j][i-1] + rgb_input[j][i+1] +
                    rgb_input[j-1][i] + rgb_input[j+1][i])/4;}
            green_out[j][row_length-1] = rgb_input[j][row_length - 2]}}

// linear interpolation for last rows
    Do j = column_length - boundary_width + 1 to j = column_length - 2 loop
        {if 2 mod (j) equals 0        // even row pattern, odd pixels blue, even pixels green
        {// linear interpolation for first pixels in row
            green_out[j][0] = rgb_input[j][1]
            Do i = 2 to i = boundary_width - 1, increment i by 2 each loop
            {green_out[j][i] = (rgb_input[j][i-1] + rgb_input[j][i+1] +
```

SPS 10/9/97

```
                                            rgb_input[j-1][i] + rgb_input[j+1][i])/4;}

// linear interpolation final pixels in row
           Do i = row_length - boundary_width to
                  i = row_length - 1,  increment i by 2 loop
              {green_out[j][i] = (rgb_input[j][i-1] + rgb_input[j][i+1] +
                                  rgb_input[j-1][i] + rgb_input[j+1][i])/4;}}
       else if 2 mod (j) equals 1
           // odd row pattern, odd pixels green, even pixels red
           {Do i = 1 to i = row_length - 3,  increment i by 2 each loop
              {green_out[j][i] = (rgb_input[j][i-1] + rgb_input[j][i+1] +
                                  rgb_input[j-1][i] + rgb_input[j+1][i])/4;}
               green_out[j][row_length-1] = rgb_input[j][row_length - 2]}}

// last row linear interpolation
Do i = 1 to i = row_length - 3,  increment i by 2 each loop
   {green_out[column_length - 1][i] = (rgb_input[column_length - 1][i - 1] +
                                        rgb_input[column_length - 1][i+1])/2 }
   green_out[0][row_length-1] = rgb_input[column_length - 1][row_length-2]    // copy last pixel // Do diagonal splines
// Do splines with filter slanted to the left (Fig. 4a) and put temporary results
// into a buffer
Do j = 0, column_length - boundary_width loop
       {k = 0
       if 2 mod (j) equals 0   //even row pattern {
              Do i = 1 to row_length - 1 ,  increment by 2 loop
              {Do m = 0 to spline_filter_lenghth -1 loop
                {// diagonal filter in result in buffer
                      temp[j][k] = temp[j][k]  + coef[m]*rgb_input[j+m][i+m]}
                      k = k+1}}
       else if 2 mod (j) equals 1 {     // odd row pattern
              k = 0
```

SPS 10/9/97

```
                    Do i = 0 to row_length , increment by 2 loop
                    {Do m = 0 to spline_filter_length {
                    // diagonal filter in result in buffer
                            temp[j][k] = temp[j][k] + coef[m]*rgb_input[j+m][i+m]}
5                           k = k + 1}}}

// Do splines with using diagonal filter top to the right (Fig. 4b)
            n = 0
            Do j = boundary_width -1 to columns_length - boundary_width loop
10                  {if 2 mod (j) equals 0 {   // even row pattern
                            Do i = boundary_width - 1 to
                                    row_length - boundary_width + 1 increment by 2 loop {
                                    Do m = 0 to spline_filter_length {
                                    // diagonal filter in result in buffer
15                                          green_out[j][i] = green_out[j][i] +
                                                    coef[m]*temp[k + m][n - m + spline_filter_length]}
                                    k = k + 1}}
                    if 2 mod (j) equals 1 {  // odd row pattern
                            Do i = boundary_width - 2 to
20                                  row_length - boundary_width - 2 increment by 2 loop {
                                    Do m = 0 to spline_filter_length {
                                    //diagonal filter in result in buffer
                                            green_out[j][i] = green_out[j][i] +
                                                    coef[m]*[ k + m][ n - m + spline_filter_length]}
25                          k = k + 1}}
                    n = n+ 1}} if Bayer pattern is 2 {
                    // first row linear interpolation
30          Do i = 1 to i = row_length - 3, increment i by 2 each loop
                    // rows, columns begin 1 not 0
                    {green_out[0][i] = (rgb_input[0][i - 1] + rgb_input[0][i+1])/2 }
            green_out[0][row_length-1] = rgb_input[0][row_length-2]      // copy last pixel
                    // rows down to where splines can be done
```

SPS 10/9/97

```
            Do j = 1 to j = boundary_width - 2 loop
                // linear interpolation for rows 2 through boundary_width
            {if 2 mod (j) equals 1       // even row pattern, odd pixels blue, even pixels green
                {green_out[j][0] = rgb_input[j][1]
                Do i = 2 to i = row_length - 2, increment i by 2 each loop
                    {green_out[j][i] = (rgb_input[j][i-1] + rgb_input[j][i+1] +
                              rgb_input[j-1][i] + rgb_input[j+1][i])/4;}}
            else if 2 mod (j) equals 0   // odd row pattern, odd pixels green, even pixels red
                {Do i = 1 to i = row_length - 3, increment i by 2 each loop
                    {green_out[j][i] = (rgb_input[j][i-1] + rgb_input[j][i+1] +
                              rgb_input[j-1][i] + rgb_input[j+1][i])/4;}
                green_out[j][row_length-1] = rgb_input[j][row_length - 2]}}

// middle rows where splines are done do beginning and ends of rows with linear //
            interpolation
            Do j = boundary_width - 1 to columns_length - boundary_width loop{
                if 2 mod (j) equals 1
                //even row pattern, odd pixels blue, even pixels green
                {       //linear interpolate beginning of row
                    green_out[j][0] = rgb_input[j][1]
                    Do i = 2 to i = boundary_width, increment i by 2 each loop
                    {green_out[j][i] = (rgb_input[j][i-1] + rgb_input[j][i+1] +
                              rgb_input[j-1][i] + rgb_input[j+1][i])/4;}
                    //linear interpolate end of row
                    Do i = row_length - boundary_width + 2 to
                       i = row_length - 2, increment i by 2 loop
                    {green_out[j][i] = (rgb_input[j][i-1] + rgb_input[j][i+1] +
                              rgb_input[j-1][i] + rgb_input[j+1][i])/4;}} else if 2 mod (j) equals 0
                // odd row pattern, odd pixels green, even pixels red
                {       // linear interpolate beginning of row
                    Do i = 1 to i = boundary_width - 3, increment i by 2 each loop
                    {green_out[j][i] = (rgb_input[j][i-1] + rgb_input[j][i+1] +
```

16

SPS 10/9/97

```
                                        rgb_input[j-1][i] + rgb_input[j+1][i])/4;}
                    // linear interpolate end of row
                    Do i = row_length - boundary_width + 1 to
                        i = row_length - 3, increment i by 2 loop
                        {green_out[j][i] = (rgb_input[j][i-1] + rgb_input[j][i+1] +
                            rgb_input[j-1][i] + rgb_input[j+1][i])/4;}
                        green_out[j][row_length-1] =
                            rgb_input[j][row_length - 2]}}

// linear interpolation last rows
        Do j = column_length - boundary_width + 1 to j = column_length - 2 loop
        {if 2 mod (j) equals 1      // even row pattern odd pixels blue, even pixels green
            {green_out[j][0] = rgb_input[j][1]
            Do i = 2 to i = row_length - 2, increment i by 2 each loop
                {green_out[j][i] = (rgb_input[j][i-1] + rgb_input[j][i+1] +
                    rgb_input[j-1][i] + rgb_input[j+1][i])/4;}}
        else if 2 mod (j) equals 0   // odd row pattern odd pixels green, even pixels red
            {Do i = 1 to i = row_length - 3, increment i by 2 each loop
                {green_out[j][i] = (rgb_input[j][i-1] + rgb_input[j][i+1] +
                    rgb_input[j-1][i] + rgb_input[j+1][i])/4;}
                green_out[j][row_length-1] = rgb_input[j][row_length - 2]}}
        // last row
        green_out[columns_length-1][0] = rgb_input[columns_length - 1][1]
        // first pixel last row
        Do i = 2 to i = row_length - 2, increment i by 2 each loop
                {green_out[columns_length - 1][i] =
                (rgb_input[columns_length - 1][i-1] +
                rgb_input[columns_length - 1][i+1])/2 }

// do diagonal splines
        //Do splines with filter slanted so to the left and put temporary results into a buffer
        Do j = 0, column_length - boundary_width{
            k = 0
            if 2 mod (j) equals 0   // even row pattern {
```

17

SPS 10/9/97

```
            Do i = 0 to row_length , increment by 2 loop
                {Do m = 0 to spline_filter_lenghth -1 {
                //diagonal filter in result in buffer
                        temp[j][k] = temp[j][k]  + coef[m]*rgb_input[j+m][i+m]}
                        k = k+1}}
        else if 2 mod (j) equals 1 {      // odd row pattern
            k = 0
            Do i = 1 to row_length - 1 , increment by 2 loop
                {Do m = 0 to spline_filter_lenghth {
                // diagonal filter in result in buffer
                   temp[j][k] = temp[j][k]  + coef[m]*rgb_input[j+m][i+m]}
                        k = k + 1}}}
    // Do splines with using diagonal filter top to the right
    n = 0
    Do j = boundary_width -1 to columns_length - boundary width loop{
        if 2 mod (j) equals 0 {   // even row pattern
            Do i = boundary_width + 1 to
                row_length - boundary_width -1 increment by 2 loop {
                Do m = 0 to spline_filter_lenghth {
                //diagonal filter in result in buffer
                      green_out[j][i]  = green_out[j][i] +
                            coef[m]*temp[k + m][n - m  + spline_filter_length]}
                k = k+ 1}}
        if 2 mod (j) equals 1 {   // odd row pattern
            Do i = boundary_width -  2 to
                row_length - boundary_width  increment by 2 loop {
                Do m  = 0 to spline_filter_lenghth {
                // diagonal filter in result in buffer
                      green_out[j][i] = green_out[j][i] +
                            coef[m]*[ k + m][ n - m  + spline_filter_length]}
                k = k + 1}}
        n = n+ 1}}
```

SPS 10/9/97

// At this point, all green values have been filled in and the red and blue values need to be
//determined

```
if Bayer pattern 1 Red top {
    Do j = 0 to column_length - 2 increment by 2 loop{
        Do i = 0 to row_length - 3 increment by 2 loop{
            red_out[j][i+1] = (rgb_input[j][i ] + rgb_input[j][i + 2])/2 +
                green_out[j][i+1] - (green_out[j][i ] + green_out[j][i + 2])/2
            red_out[j+1][i] = (rgb_input[j][i] + rgb_input[j+2][i])/2 +
                green_out[j+1][i] - (green_out[j][i ] +
                green_out[j+2][i ])/2
            red_out[j+1][i+1] = (rgb_input[j][i] + rgb_input[j][i+2] +
                rgb_input[j+2][i] + rgb_input[j+2][i+2] )/4
                green_out[j+1][i+1] - (green_out[j][i ] +
                green_outt[j][i + 2] +
                green_out[j+2][i ] + green_outt[j+2][i + 2] )/4
        { // end of the 2 lines
            red_out[j + 1][row_length - 2] = (rgb_input[j] [row_length - 2] +
                rgb_input[j + 2] [row_length - 2])/2 +
                green_out[j + 1][row_length - 2] -
                (green_out[j] [row_length - 2] +
                green_out[j + 2] [row_length - 2])/2
            red_out[j ][row_length - 1] = rgb_input[j][row_length - 2]
            red_out[j + 1 ][row_length - 1] = red_out[j + 1][row_length - 2]
        { // last two lines
        Do i = 0 to i = row_length - 2 increment by 2 loop
            red_out[j][i+1] = (rgb_input[j][i ] + rgb_input[j][i + 2])/2 +
                green_out[j][j+1] - (green_out[j][i ] + green_out[j][i + 2])/2 }
        red_out[columns_length -2 ][row_length - 1] =
            rgb_input[column_length-2][row_length - 2]
        // copy last line
        Do i = 0 to row_length -1  loop{
            red_out[column_length -1][i] = red_out[column_length -2][i]}
```

19

SPS 10/9/97

```
// do second line with blues
blue_out[1][0] = rgb_input[1][1]   // copy first in row
Do i = 2 to i - 3 increment by 2 loop{
        blue_out[j][i] = (rgb_input[j][i - 1] + rgb_input[j][i + 1])/2 +
                green_out[j][j] - (green_out[j][i - 1] + green_out[j][i + 1])/2}

// now copy blues into first line;
Do i = 0 to row_length -1 {
        blue_out[0][i] = blue_out[1][i]}
// Do two rows at a time
Do j = 2 to column_length - 2 increment by 2 loop
        blue_out[j][i-1] = (rgb_input[j-1][i-1] + rgb_input[j+1][i-1])/2 +
          green_out[j][i - 1] - (green_out[j-1][i - 1 ] + green_outt[j+1][i - 1])/2
        blue_out[j][i-2] = blue_out[j][i-1]
        blue_out[j+1][i-2] = rgb_input[j+1][i-1]
        Do i = 2 to row_length - 2
                blue_out[j][i+1] = (rgb_input[j - 1][i + 1 ] +
                        rgb_input[j+ 1][i + 1])/2 +
                        green_out[j][j+1] - (green_out[j - 1] [i + 1] +
                        green_out[j + 1][i + 1])/2
                blue_out[j+1][i] = (rgb_input[j+1][i-1] + rgb_input[j+1][i+1])/2 +
                        green_out[j+1][i] - (green_out[j+1][i -1] +
                        green_out[j+1][i + 1])/2
                blue_out[j][i] = (rgb_input[j-1][i-1] + rgb_input[j-1][i+1] +
                        rgb_input[j+1][i-1] + rgb_input[j+1][i+1] )/4
        green_out[j][i] - (green_out[j-1][i-1 ] +
                green_outt[j-1][i + 1] +
                green_out[j+1][i-1 ] + green_outt[j+1][i+1 ] )/4}}} if Bayer pattern 2 Red top {
        Do j = 0 to column_length - 2 increment by 2 loop{
                // beginning of the 2 lines
                red_out[j + 1][1] = (rgb_input[j] [1] + rgb_input[j + 2] [1])/2 +
                        green_out[j + 1][1] -
```

20

SPS 10/9/97

```
                    (green_out[j] [1] + green_out[j + 2] [1])/2
              red_out[j ][0] = rgb_input[j][1]
              red_out[j + 1][0] = red_out[1]

5            Do i = 2 to row_length - 1 increment by 2 loop{
                   red_out[j][i] = (rgb_input[j][i-1 ] + rgb_input[j][i + 1])/2 +
                        green_out[j][i] - (green_out[j][i - 1 ] + green_out[j][i + 1)/2
                   red_out[j + 1][i + 1] = (rgb_input[j][i + 1] + rgb_input[j + 2][i + 1])/2 +
                        green_out[j + 1][i + 1] - (green_out[j][i + 1] +
10                      green_out[j + 2][i + 1])/2
                   red_out[j + 1][i] = (rgb_input[j][i-1] + rgb_input[j][i + 1] +
                        rgb_input[j + 2][i-1] + rgb_input[j + 2][i + 1] )/4
                             green_out[j + 1][i] - (green_out[j][i -1] + green_outt[j][i + 1] +
                        green_out[j + 2][i -1] + green_outt[j + 2][i + 1 ])/4}
15            {// last two lines
              red_out[columns_length -2 ][0] = rgb_input[column_length - 2][1]
              Do i = 2 to i = row_length - 2 increment by 2 loop
                   red_out[j][i] = (rgb_input[j][i -1] + rgb_input[j][i + 1])/2 +
                        green_out[j][j] - (green_out[j][I-1 ] + green_out[j][i + 1])/2 }
20            red_out[columns_length -2 ][row_length - 1] =
                   rgb_input[column_length - 2][row_length - 2]

// copy last line
              Do i = 0 to row_length -1  loop{
25                 red_out[column_length -1][i] = red_out[column_length -2][i]}
              // do second line with blues
              Do i = 1 to i - 3 increment by 2 loop{
                   blue_out[j][i] = (rgb_input[j][i - 1] + rgb_input[j][i + 1])/2 +
                        green_out[j][j] - (green_out[j][i - 1] +
30                      green_out[j][i + 1])/2}
              blue_out[1][row_length - 1] = rgb_input[1][row_length -2]  // copy end of row
              // now copy blues into first line;
              Do i = 0 to row_length -1 loop{
                   blue_out[0][i] = blue_out[1][i]}
```

21

SPS 10/9/97

```
// Do two rows at a time
Do j = 0 to column_length - 3 increment by 2 loop
    Do i = 2 to row_length - 2 increment by 2 loop
        blue_out[j][i] = (rgb_input[j - 1][i] + rgb_input[j + 1][i])/2 +
            green_out[i][j] - (green_out[j - 1] [i] +
            green_outt[j + 1][i])/2
        blue_out[j + 1][i + 1] = (rgb_input[j + 1][i] + rgb_input[j + 1][i + 2])/2 +
            green_out[j + 1][i + 1] - (green_out[j + 1][i ] +
            green_out[j + 1][i + 2])/2
        blue_out[j][i + 1] = (rgb_input[j-1][i] + rgb_input[j-1][i + 2] +
            rgb_input[j + 1][i] + rgb_input[j + 1][i + 1] )/4
        green_out[j][i + 1] - (green_out[j-1][i ] +
            green_outt[j-1][i + 2] +
            green_out[j + 1][i] + green_outt[j + 1][i + 2 ] )/4}
    blue_out[j][row_length - 2] = (rgb_input[j-1][row_length - 2] +
        rgb_input[j + 1][row_length - 2])/2 + green_out[j][row_length - 2] -
        (green_out[j-1][row_length - 2 ] +
        green_out[j + 1][row_length - 2])/2
    blue_out[j][row_length - 1] = blue_out[j][row_length - 2]
    blue_out[j + 1][row_length - 1] = rgb_input[j + 1][row_length - 2]}} if Bayer pattern 1 Blue top {
    Do j = 0 to column_length - 2 increment by 2 loop{
        Do i = 0 to row_length - 3 increment by 2 loop{
            blue_out[j][i + 1] = (rgb_input[j][i ] + rgb_input[j][i + 2])/2 +
                green_out[j][j + 1] - (green_out[j][i ] + green_out[j][i + 2])/2
            blue_out[j + 1][i] = (rgb_input[j][i] + rgb_input[j + 2][i])/2 +
                green_out[j + 1][i] - (green_out[j][i ] +
                green_outt[j][i + 2])/2
            blue_out[j + 1][i + 1] = (rgb_input[j][i] + rgb_input[j + 2][i] +
                rgb_input[j + 2][i] + rgb_input[j + 2][i + 2] )/4
                green_out[j + 1][i + 1] - (green_out[j][i ] +
                green_outt[j][i + 2] +
```

22

SPS 10/9/97

```
                                green_out[j+2][i ] + green_outt[j+2][i + 2] )/4
                {// end of the 2 lines
                blue_out[j + 1][row_length - 2] = (rgb_input[j] [row_length - 2] +
                        rgb_input[j + 2] [row_length - 2])/2 +
                        green_out[j + 1][row_length - 2] -
                        (green_out[j] [row_length - 2] +
                        green_out[j + 2] [row_length - 2])/2
                blue_out[j ][row_length - 1] = rgb_input[j][row_length - 2]
                blue_out[j + 1 ][row_length - 1] = blue_out[j + 1][row_length - 2]

{// last two lines
        Do i = 0 to i = row_length - 2 increment by 2 loop
                blue_out[j][i + 1] = (rgb_input[j][i ] + rgb_input[j][i + 2])/2 +
                        green_out[j][j + 1] - (green_out[j][i ] + green_out[j][i + 2])/2 }
        blue_out[columns_length -2 ][row_length - 1] =
                rgb_input[column_length - 2][row_length - 2]
        // copy last line
        Do i = 0 to row_length -1 loop {
                blue_out[column_length -1][i] = blue_out[column_length -2][i]}

// do second line with reds
        red_out[1][0] = rgb_input[1][1] // copy first in row
        Do i = 2 to i - 3 increment by 2 loop{
                red_out[j][i] = (rgb_input[j][i - 1] + rgb_input[j][i + 1])/2 +
                        green_out[j][j] - (green_out[j][i - 1] +
                        green_out[j][i + 1])/2}
        // now copy blues into first line;
        Do i = 0 to row_length -1 loop{
                red_out[0][i] = red_out[1][i]}
        // Do two rows at a time
        Do j = 2 to column_length - 2 increment by 2 loop
                //Do first two in two rows
                red_out[j][i-1] = (rgb_input[j-1][i-1] + rgb_input[j + 1][i-1])/2 +
                        green_out[j][i - 1] - (green_out[j-1][i - 1 ] +
```

23

SPS 10/9/97

```
                    green_outt[j+1][i - 1])/2
        red_out[j][i-2] = red_out[j][i-1]
        red_out[j+1][i-2] = rgb_input[j+1][i-1]
        Do i = 2 to row_length - 2 loop
            red_out[j][i+1] = (rgb_input[j - 1][i + 1 ] +
            rgb_input[j+ 1][i + 1])/2 +
                green_out[j][j+1] - (green_out[j - 1] [i + 1] +
                green_outt[j + 1][i +1])/2
            red_out[j+1][i] = (rgb_input[j+1][i-1] + rgb_input[j+1][i+1])/2 +
                green_out[j+1][i] - (green_out[j+1][i -1] +
                green_out[j+1][i + 1])/2
            red_out[j][i] = (rgb_input[j-1][i-1] + rgb_input[j-1][i+1] +
                rgb_input[j+1][i-1] + rgb_input[j+1][i+1] )/4
            green_out[j][i] - (green_out[j-1][i-1 ] +
                green_outt[j-1][i + 1]+
                green_out[j+1][i-1 ] + green_out[j+1][i+1 ])/4}}} if Bayer pattern 2 Blue top {
        Do j = 0 to column_length - 2 increment by 2 loop{
            // beginning of the 2 lines
            blue_out[j + 1][1] = (rgb_input[j] [1] + rgb_input[j + 2] [1])/2 +
                green_out[j + 1][1] -
                (green_out[j] [1] + green_out[j + 2] [1])/2
            blue_out[j ][0] = rgb_input[j][1]
            blue_out[j+1][0] = blue_out[1]

Do i = 2 to row_length - 1 increment by 2 loop{
                blue_out[j][i] = (rgb_input[j][i-1 ] + rgb_input[j][i + 1])/2 +
                    green_out[j][i] - (green_out[j][i - 1 ] + green_out[j][i + ])/2
                blue_out[j+1][i+1] = (rgb_input[j][i+1] +
                    rgb_input[j+2][i+1])/2 +
                    green_out[j+1][i+1] - (green_out[j][i+1] +
                    green_out[j+2][i + 1])/2
                blue_out[j+1][i] = (rgb_input[j][i-1] + rgb_input[j][i+1] +
```

24

SPS 10/9/97

```
                                rgb_input[j + 2][i-1] + rgb_input[j + 2][i + 1] )/4
                                green_out[j + 1][i] - (green_out[j][i -1] +
                                green_outt[j][i + 1] +
                                green_out[j + 2][i -1] + green_out[j + 2][i + 1] )/4}
5       {// last two lines
        blue_out[columns_length -2 ][0] = rgb_input[column_length - 2][1]
        Do i = 2 to i = row_length - 2 increment by 2 loop
                blue_out[j][i] = (rgb_input[j][i -1] + rgb_input[j][i + 1])/2 +
                        green_out[j][j] - (green_out[j][I-1 ] + green_out[j][i + 1])/2 }
10      blue_out[columns_length -2 ][row_length - 1] =
                rgb_input[column_length - 2][row_length - 2]
        // copy last line
        Do i = 0 to row_length -1  loop{
                blue_out[column_length -1][i] = blue_out[column_length -2][i]}
15      // do second line with reds
        Do i = 1 to i - 3 increment by 2 loop{
                red_out[j][i] = (rgb_input[j][i - 1] + rgb_input[j][i + 1])/2 +
                        green_out[j][j] - (green_out[j][i - 1] +
                        green_out[j][i + 1])/2}
20      red_out[1][row_length - 1] = rgb_input[1][row_length -2]  // copy end of row
        // now copy blues into first line;
        Do i = 0 to row_length -1 loop{
                red_out[0][i] = red_out[1][i]}

25      // Do two rows at a time
        Do j = 0 to column_length - 3 increment by 2 loop
                Do i = 2 to row_length - 2 increment by 2 loop
                        red_out[j][i] = (rgb_input[j - 1][i] + rgb_input[j + 1][i])/2 +
                                green_out[i][j] - (green_out[j - 1] [i] +
30                              green_outt[j + 1][i])/2
                        red_out[j + 1][i + 1] = (rgb_input[j + 1][i] + rgb_input[j + 1][i + 2])/2 +
                                green_out[j + 1][i + 1] - (green_out[j + 1][i ] +
                                green_out[j + 1][i + 2])/2
                        red_out[j][i + 1] = (rgb_input[j-1][i] + rgb_input[j-1][i + 2] +
```

25

SPS 10/9/97

```
                            rgb_input[j+1][i]  +  rgb_input[j+1][i+2] )/4
                   green_out[j][i+1] - (green_out[j-1][i ] +
                            green_outt[j-1][i  +  2] +
                            green_out[j+1][i]  +  green_outt[j+1][i+2 ] )/4}
5                  red_out[j][row_length - 2] = (rgb_input[j-1][row_length - 2] +
                       rgb_input[j+1][row_length - 2])/2  +  green_out[j][row_length - 2] -
                       (green_out[j-1][row_length - 2 ] +
                       green_out[j+1][row_length - 2])/2
                  red_out[j][row_length - 1] = red_out[j][row_length - 2]
10                      red_out[j+1][row_length - 1] = rgb_input[j+1][row_length - 2]}}
```

What is claimed is:

1. A method of generating missing color values for pixels in an array, each pixel having one of at least first, second, and third color values, comprising:

determining values for all missing second color values for pixels in the array through interpolation of known second color values adjacent along diagonal lines from the missing second color values by determining temporary values for the second color which lie at the corners of pixels having known second color values using filters oriented along diagonally adjacent second color pixels and by determining final values for the second color at centers of pixels having known first and third color values by using filters oriented along diagonally adjacent first and third color pixels and sampling the temporary second color values; and determining values for all missing first and third color values for the pixels from a sum of an interpolation term and a luminance correction term based on differences between second color values of adjacent pixels.

2. The method of claim 1, wherein the filters comprise cubic B-spline filters.

3. The method of claim 1, wherein the pixels of the array have color values arranged according to a Bayer pattern.

4. The method of claim 1, wherein the interpolation term comprises first color values of at least two horizontally or vertically adjacent pixels.

5. The method of claim 1, wherein the interpolation term comprises third color values of at least two horizontally or vertically adjacent pixels.

6. The method of claim 1, wherein the luminance correction term includes the difference between the second color value at the location of an interpolated value of a first color value and second color values at locations of measured first color values used in the calculation of the interpolation term.

7. The method of claim 1, wherein the luminance correction term includes the difference between the first color value at the location of an interpolated value of a third color value and second color values at locations of measured third color values used in the calculation of the interpolation term.

8. The method of claim 1, wherein the first color value is red, the second color value is green, and the third color value is blue.

9. A system for generating missing color values for pixels in an array, each pixel having one of first, second, or third color values, comprising:

means for determining values for all missing second color values for pixels in the array through interpolation of known second color values adjacent along diagonal lines from the missing second color values by determining temporary values for the second color which lie at the corners of pixels having known second color values using filters oriented along diagonally adjacent second color pixels and by determining final values for the second color at centers of pixels having known first and third color values by using filters oriented along diagonally adjacent first and third color pixels and sampling the temporary second color values; and means for determining values for all missing first and third color values for the pixels from a sum of an interpolation term and a luminance correction term based on differences between second color values of adjacent pixels.

10. The system of claim 9, wherein the first color value is red, the second color value is green, and the third color value is blue.

11. The system of claim 9, wherein the filters comprise cubic B-spline filters.

12. A system for processing a color filter image having a plurality of pixels, each pixel having one of first, second, or third color values, comprising:

a storage medium to store the color filter array and a plurality of programming instructions; and a processor coupled to the storage medium, the processor executing the programming instructions for determining values for all missing second color values for pixels in the color filter image through interpolation of known second color values adjacent along diagonal lines from the missing second color values by determining temporary values for the second color which lie at the corners of pixels having known second color values using filters oriented along diagonally adjacent second color pixels and by determining final values for the second color at centers of pixels having known first and third color values by using filters oriented along diagonally adjacent first and third color pixels and sampling the temporary second color values; and determining values for all missing first and third color values for the pixels from a sum of an interpolation term and a luminance correction term based on differences between second color values of adjacent pixels.

13. The system of claim 12, wherein the first color value is red, the second color value is green, and the third color value is blue.

14. The system of claim 12, wherein the filters comprise cubic B-spline filters.

15. A machine readable medium having stored therein a plurality of machine readable instructions designed to be executed by a processor, the machine readable instructions for generating missing color values for pixels in a color filter image, each pixel having one of first, second, or third color values, the machine readable instructions comprising instructions for determining values for all missing second color values for pixels in the color filter image through interpolation of known second color values adjacent along diagonal lines from the missing second color values by determining temporary values for the second color which lie at the corners of pixels having known second color values using filters oriented along diagonally adjacent second color pixels and by determining final values for the second color at centers of pixels having known first and third color values by using filters oriented along diagonally adjacent first and third color pixels and sampling the temporary second color values, and for determining values for all missing first and third color values for the pixels from a sum of an interpolation term and a luminance correction term based on differences between second color values of adjacent pixels.

16. The machine readable medium of claim 15, wherein the first color value is red, the second color value is green, and the third color value is blue.

17. The machine readable medium of claim 15, wherein the filters comprise cubic B-spline filters.

* * * * *